US010230491B2

(12) United States Patent
Soro et al.

(10) Patent No.: US 10,230,491 B2
(45) Date of Patent: Mar. 12, 2019

(54) SYSTEM AND METHOD FOR COMMUNICATION IN A BODY AREA NETWORK SYSTEM

(71) Applicant: General Electric Company, Schenectady, NY (US)

(72) Inventors: Stanislava Soro, Niskayuna, NY (US); Steven William Wik, Niskayuna, NY (US); SM Shajedul Hasan, Rexford, NY (US); David Michael Davenport, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 85 days.

(21) Appl. No.: 14/969,270

(22) Filed: Dec. 15, 2015

(65) Prior Publication Data
US 2017/0170924 A1    Jun. 15, 2017

(51) Int. Cl.
*H04L 1/00* (2006.01)
*H04W 4/80* (2018.01)
*H04L 12/26* (2006.01)

(52) U.S. Cl.
CPC .......... *H04L 1/0021* (2013.01); *H04L 1/0002* (2013.01); *H04L 1/0026* (2013.01); *H04L 43/0829* (2013.01); *H04W 4/80* (2018.02)

(58) Field of Classification Search
None
See application file for complete search history.

(56) References Cited

U.S. PATENT DOCUMENTS

| 7,742,816 B2 | 6/2010 | Masoud et al. |
| 8,363,693 B2 | 1/2013 | Fujiwara |
| 8,704,656 B2 | 4/2014 | Abedi |

(Continued)

FOREIGN PATENT DOCUMENTS

KR    20150138463 A    12/2015

OTHER PUBLICATIONS

Chek et al., "On adaptive frequency hopping to combat coexistence interference between Bluetooth and IEEE 802.11b with practical resource constraints", Parallel Architectures, Algorithms and Networks, 2004. Proceedings. 7th International Symposium, 6 Pages, 2004.

(Continued)

*Primary Examiner* — Kouroush Mohebbi (57) ABSTRACT

A method for controlling data flow in a wireless body area network includes transmitting sensor data from a plurality of sensor nodes to a gateway via a first transmission channel. The method further includes transmitting beacon data from the gateway to the plurality of sensor nodes via the first transmission channel. The method also includes determining channel packet loss information of the first transmission channel based on at least one of a beacon packet loss information included in the sensor data and a sensor packet loss information included in the beacon data. The method further includes comparing the channel packet loss information with a packet loss threshold. The method also includes switching flow of the sensor data and the beacon data through a second transmission channel instead of the first transmission channel, if the channel packet loss information is greater than the packet loss threshold.

21 Claims, 7 Drawing Sheets

(56) References Cited

U.S. PATENT DOCUMENTS

| | | |
|---|---|---|
| 8,964,662 B2 | 2/2015 | Goyal et al. |
| 8,976,835 B2 | 3/2015 | Sarca et al. |
| 9,706,923 B2 | 7/2017 | Soro et al. |
| 2009/0185548 A1* | 7/2009 | Pratapagiri .......... A61B 5/0002 370/346 |
| 2010/0062705 A1 | 3/2010 | Rajkotia et al. |
| 2011/0149759 A1* | 6/2011 | Jollota ................. A61B 5/0024 370/252 |
| 2011/0176504 A1 | 7/2011 | Patel |
| 2012/0225683 A1 | 9/2012 | Matulis et al. |
| 2013/0023214 A1 | 1/2013 | Wang et al. |
| 2013/0145236 A1 | 6/2013 | Baker |
| 2014/0036863 A1 | 2/2014 | Lim et al. |
| 2014/0198704 A1 | 7/2014 | Tetteh et al. |

OTHER PUBLICATIONS

Popovski et al., "Strategies for adaptive frequency hopping in the unlicensed bands", Wireless Communications, IEEE, vol. 13, Issue 6, pp. 60-67, Dec. 2006.

Thakur et al., "Multichannel Communication—A Need for Wireless Sensor Networks", International Journal of Advanced Research in Computer Science and Software Engineering, vol. 4, Issue 3, pp. 786-794, Mar. 2014.

PCT Search Report and Written Opinion issued in connection with corresponding PCT Application No. PCT/US2016/055483 dated Jan. 16, 2017.

PCT IPRP issued in connection with corresponding PCT Application No. PCT/US2016/055483 dated Jun. 28, 2018.

* cited by examiner

SYSTEM AND METHOD FOR COMMUNICATION IN A BODY AREA NETWORK SYSTEM

BACKGROUND

Embodiments of the present invention relate generally to network communications and more particularly to system and method for communication in body area network system.

Frequency hopping is an established technique used in wireless communication systems to protect data transmitted by one device against interference from data transmitted by other devices operating in a same frequency range. Frequency hopping is also used to overcome other channel impairments such as fading. Conventional hopping techniques are inherent with overheads caused by constantly switching channels during a time duration in which the system is unable to transmit information. Moreover, channels are switched in such a technique even when there is no interference leading to a possibility of switching from a channel free from interference to a channel experiencing interference.

Recently, wireless communication networks are employed for medical applications such as wireless body area network (WBAN) for monitoring a patient's vital signs. Wireless personal area network (WPAN) may be used as a gateway by the WBAN to reach telemetry stations and/or repeaters, so that the monitors can communicate the information to a centralized location.

WBANs operate in close proximity because of the proximity of hospital beds to one another. Such close operating proximity can cause interference between the WBANs. Interference can also occur between sensor devices of the same WBAN. Further, there may be interferences from other sources such as WiFi, Bluetooth, and Zigbee among other networks. Communication network protocols are employed in WBANs to overcome the interference.

The data outage specifications can require a transmission success rate of, for example, about 95% because of the critical nature of the information being transmitted by a patient's WBAN. Conventional monitoring networks employ re-transmission of data to increase reliability but at the cost of increased transmission delay and latency.

BRIEF DESCRIPTION

In accordance with one aspect of the present specification, a method for controlling data flow in a wireless body area network is disclosed. The method includes transmitting sensor data from a plurality of sensor nodes to a gateway via a first transmission channel from a first set of transmission channels, using a multiplexing technique. The sensor data comprises beacon packet loss information corresponding to the first transmission channel. The method further includes transmitting beacon data from the gateway to the plurality of sensor nodes via the first transmission channel from the first set of transmission channels. The beacon data comprises sensor packet loss information corresponding to the first transmission channel. The method also includes determining channel packet loss information of the first transmission channel based on at least one of the beacon packet loss information and the sensor packet loss information. The method further includes comparing the channel packet loss information with a packet loss threshold. The method also includes switching flow of the sensor data and the beacon data through a second transmission channel from a second set of transmission channels different from the first set of transmission channels, instead of the first transmission channel, if the channel packet loss information is greater than the packet loss threshold.

In accordance with another aspect of the present specification, a wireless body area network system is disclosed. The system includes a plurality of sensor nodes configured to transmit sensor data via a first transmission channel from a first set of transmission channels, using a multiplexing technique. The sensor data comprises beacon packet loss information corresponding to the first transmission channel. The system further includes a gateway communicatively coupled to the plurality of sensor nodes and configured to transmit beacon data to the plurality of sensor nodes via the first transmission channel from the first set of transmission channels. The beacon data comprises sensor packet loss information corresponding to the first transmission channel. The gateway is further configured to determine channel packet loss information of the first transmission channel based on at least one of the beacon packet loss information and the sensor packet loss information. The gateway is further configured to compare the channel packet loss information with a packet loss threshold. The gateway is also configured to switch flow of the sensor data and the beacon data through a second transmission channel from a second set of transmission channels different from the first set of transmission channels, instead of the first transmission channel, if the channel packet loss information is greater than the packet loss threshold.

In accordance with another aspect of the present specification, a non-transitory computer readable medium having instructions to enable at least one processor to control data flow in a wireless body area network is disclosed. The instructions enable the at least one processor to control data flow by transmitting sensor data from a plurality of sensor nodes to a gateway via a first transmission channel from a first set of transmission channels, using a multiplexing technique. The sensor data includes beacon packet loss information corresponding to the first transmission channel. The instructions further enable the at least one processor to control data flow by transmitting beacon data from the gateway to the plurality of sensor nodes via the first transmission channel from the first set of transmission channels. The beacon data includes sensor packet loss information corresponding to the first transmission channel. The instructions also enable the at least one processor to control data flow by determining channel packet loss information of the first transmission channel based on at least one of the beacon packet loss information and the sensor packet loss information. The instructions further enable the at least one processor to control data flow by comparing the channel packet loss information with a packet loss threshold. The instructions also enable the at least one processor to control data flow by switching flow of the sensor data and the beacon data through a second transmission channel from a second set of transmission channels different from the first set of transmission channels, instead of the first transmission channel, if the channel packet loss information is greater than the packet loss threshold.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments of the present invention disclose methods and systems for controlling data flow in a wireless body area network (WBAN). The method includes transmitting sensor data from a plurality of sensor nodes to a gateway through a transmission channel. It should be noted herein that the sensor data is transmitted in the form of data packets. The sensor data is transmitted using a multiplexing technique. The term 'multiplexing' refers to combining data from a plurality of data sources into a single stream of data to generate multiplexed data. The multiplexed data may be processed to retrieve data from the plurality of sources, using a corresponding demultiplexing technique. The multiplexed data may be in the form of data packets and combining of data may be performed in time domain, frequency domain, or using spread spectrum codes. The sensor data includes a beacon packet loss information corresponding to the transmission channel. The beacon data is transmitted from the gateway to the plurality of sensor nodes through the transmission channel. It should also be noted herein that the beacon data is transmitted in the form of data packets. The beacon data includes sensor packet loss information corresponding to the transmission channel. A channel packet loss information is determined based on at least one of the beacon packet loss information and the sensor packet loss information. The channel packet loss information is compared with a packet loss threshold and flow of the sensor data and the beacon data is switched to a different transmission channel if the channel packet loss information is greater than the packet loss threshold.

The term 'sensor data' refers to data obtained from a plurality of sensors deployed in a WBAN. The term 'sensor node' refers to a standalone sensor combined with a transceiver, disposed on the body of a patient and configured to communicate the sensor data through a wireless channel. The term 'gateway' refers to a transceiver communicatively coupled to a plurality of sensor nodes and associated infrastructure. The terms 'packet' and 'data packet' are used equivalently and interchangeably referring to a number of bytes of sensor data transmitted from a sensor node in the context of WBAN. The term 'frame' refers to a time interval during which a plurality of packets are transmitted from a plurality of sensor nodes of WBAN. The term 'super frame' refers to a plurality of frames. The terms 'beacon' and 'beacon data' are used equivalently and interchangeably to refer to acknowledgement data and other supervisory data transmitted from the gateway to the plurality of sensor nodes. The term 'sensor packet loss information' refers to a parameter indicative of packet loss in a transmission channel extending from a particular sensor node to the gateway of WBAN. In certain embodiments, the term may also indicative of a cumulative packet loss of the plurality of sensor nodes. The term 'beacon packet loss information' refers to a parameter indicative of the packet loss in a transmission channel extending from the gateway to a particular sensor node of WBAN. The terms 'protocol' and the 'communication protocol' are used equivalently and interchangeably to refer to a scheme of communication of the sensor data between the plurality of sensor nodes and the gateway. When the sensor data is transmitted from the plurality of sensor nodes to the gateway, the corresponding transmission channel may be referred to as 'forward channel'. When the data is transmitted from the gateway to the plurality of sensor node, the corresponding transmission channel may be referred to as 'return channel'.

Figure 1:
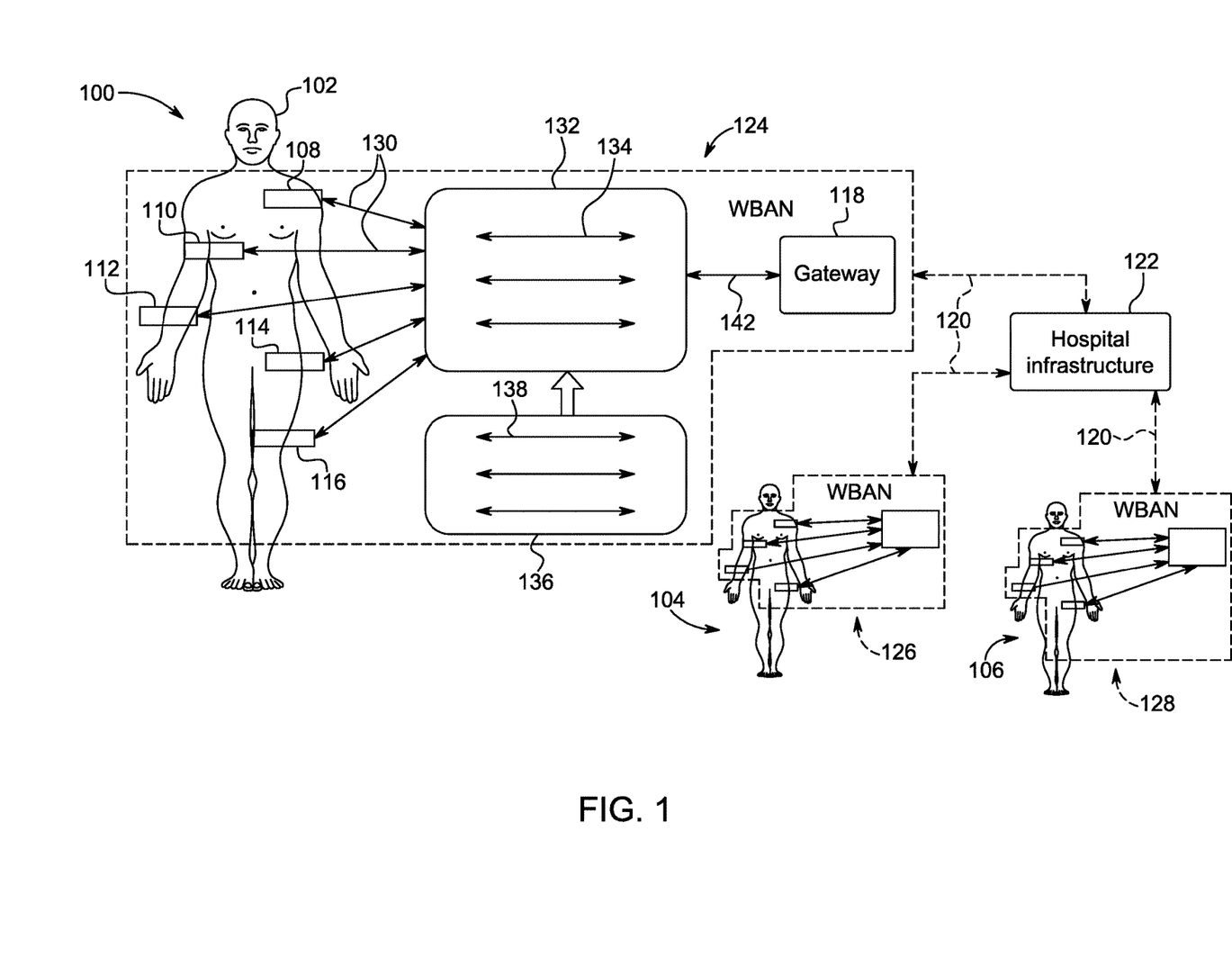
FIG. 1 is a diagrammatic illustration of a body area network system in accordance with an exemplary embodiment.

FIG. 1 is a diagrammatic illustration of a wireless body area network system 100 deployed in accordance with an exemplary embodiment. The wireless body area network system 100 such as a hospital system, includes a plurality of wireless body area networks (WBANs) 124, 126, 128 applied to a plurality of patients 102, 104, 106 respectively. The plurality of WBANs 124, 126, 128 is communicatively coupled to a hospital infrastructure 122 through a plurality of communication links 120. In one embodiment, the hospital infrastructure 122 includes a communication network such as a local area network (LAN), or any other internet communication system for facilitating communications within the WBANs 124, 126, 128 and achieving data generated by them. The number of WBANs may vary depending on the application. The number of WBANs may also depend on area of the hospital room or occupancy in the hospital room. The architecture of the wireless body area network system 100 may also vary depending on the application. In the illustrated embodiment, although the architecture is explained specifically with reference to the WBAN 124, it should not be construed as a limitation of the invention.

The WBAN 124 includes a plurality of sensor nodes 108, 110, 112, 114, 116 configured to receive a plurality of physiological parameters and generate sensor data 130 while the patient 102 is continuously monitored. The plurality of sensor nodes 108, 110, 112, 114, 116 is further configured to transmit the sensor data 130 to a gateway 118. In one embodiment, the plurality of sensor nodes 108, 110, 112, 114, 116 and the gateway 118 are initialized during a network startup phase. In one embodiment of the network startup phase, the plurality of sensor nodes 108, 110, 112, 114, 116 and the gateway 118 are paired automatically when the sensor nodes 108, 110, 112, 114, 116 and the gateway 118 are brought in close proximity with each other, referred herein as 'pairing process'. The sensor data 130 includes, but not limited to, ECG data, EEG data, SpO$_2$ data, temperature data, heart rate, and blood pressure values. Each sensor node 108, 110, 112, 114, 116 is configured to generate sensor data 130 in the form of data packets having a specific physiological parameter. For example, the sensor node 108 may generate data packets having EEG data, the sensor node 110 may generate data packets having heart rate information, the sensor node 112 may generate data packets having SpO$_2$ data, and the like. The number of sensor nodes may vary depending on the application.

Further, the plurality of sensor nodes 108, 110, 112, 114, 116 is configured to transmit sensor data 130 to the gateway 118 through a first set of transmission channels 132. In one embodiment, the sensor data 130 is transmitted to the gateway 118 through a first transmission channel 134 among the first set of transmission channels 132. The sensor data 130 transmitted from the plurality of sensor nodes 108, 110, 112, 114, 116, may be combined using a data multiplexing technique such as, but not limited to, a time division multiplexing technique, a frequency division multiplexing technique, and a code division multiplexing technique. In another embodiment, the sensor data 130 is transmitted through a plurality of transmission channels among the first set of transmission channels 132 sequentially. For example, when there are three transmission channels in the first set of transmission channels 132, the sensor data 130 is transmitted through the first transmission channel 134 for a first time duration, one of the other two transmission channels for a second time duration and the remaining transmission channel for a third time duration.

The plurality of sensor nodes 108, 110, 112, 114, 116 is also configured to receive beacon data 142 transmitted from the gateway 118 through the first set of transmission channels 132. The plurality of sensor nodes 108, 110, 112, 114, 116 is also configured to analyze the beacon data 142 to determine successful transmission of previously transmitted sensor data 130. When there is no confirmation about the successful transmission of the sensor data 130 from the analysis of the beacon data 142, re-transmission of the previously transmitted sensor data 130 is initiated by the plurality of sensor nodes 108, 110, 112, 114, 116, using a diversity transmission technique. In one embodiment, a time diversity technique is used by repeatedly transmitting the same sensor data 130 to the gateway 118. In another embodiment, a frequency diversity technique is used by sending the same sensor data 130 at multiple frequencies.

The plurality of sensor nodes 108, 110, 112, 114, 116 is further configured to estimate quality of each transmission channel of the first set of transmission channels 132 while the beacon data 142 is transmitted from the gateway 118 to the plurality of sensor nodes 108, 110, 112, 114, 116 by determining beacon packet loss information. The beacon packet loss information is indicative of interferences experienced by the beacon data 142 while being transmitted through corresponding transmission channel to each individual sensor node 108, 110, 112, 114, 116. Such interferences may occur due to transmission of data in other WBANs 126, 128. Interferences may also occur due to increased path loss due to position of the patient with respect to the gateway 118. In one embodiment, the beacon packet loss information includes a plurality of beacon packet loss values corresponding to the plurality of sensor nodes 108, 110, 112, 114, 116. For example, the sensor data 130 from the sensor node 108, includes physiological parameters and the beacon packet loss value associated with the sensor node 108. In one embodiment, the beacon packet loss value associated with the sensor node 108 is the number of data packets lost while sensor data 130 is transmitted from gateway 118 to the sensor node 108.

The gateway 118 is configured to receive the sensor data 130 transmitted by the plurality of sensor nodes 108, 110, 112, 114, 116 through one of the first set of transmission channels 132, such as the first transmission channel 134. The gateway 118 is configured to verify successful reception of the sensor data 130 from each of the plurality of sensor nodes 108, 110, 112, 114, 116 and generate corresponding acknowledgment data. The gateway 118 is also configured to estimate quality of the first transmission channel 134, for example, extending from the plurality of sensor nodes 108, 110, 112, 114, 116 to the gateway 118 and generate sensor packet loss information based on the estimated quality. The sensor packet loss information is indicative of interferences experienced by the sensor data 130 while transmitting through the corresponding transmission channel. The interferences in the corresponding transmission channel may occur due to data transmission from other WBANs 126, 128. The sensor packet loss information includes a plurality of sensor packet loss values corresponding to the plurality of sensor nodes 108, 110, 112, 114, 116. The gateway 118 is also configured to generate the beacon data 142 having acknowledgement data and the sensor packet loss information. In one embodiment, the beacon data 142 is transmitted by the gateway 118 through the first transmission channel 134. In one example, the sensor packet loss information corresponding to the sensor node 108 is equal to the number of data packets lost during transmission of sensor data 130 from the sensor node 108 to the gateway 118.

The gateway 118 is also configured to determine channel packet loss information based on at least one of the sensor packet loss information and the beacon packet loss information. In one embodiment, the channel packet loss information is equal to the number of data packets lost during transmission of the sensor data 130 from one or more of the plurality of sensor nodes 108, 110, 112, 114, 116 to the gateway 118. In another embodiment, the channel packet loss information is equal to the number of data packets lost during transmission of beacon data from the gateway 118 to one or more of the plurality of sensor nodes 108, 110, 112, 114, 116. In another embodiment, the channel packet loss information may be determined as a weighted sum computed based on a plurality of sensor packets loss values corresponding to the plurality of sensor nodes 108, 110, 112, 114, 116. The gateway 118 is further configured to compare the channel packet loss information with a packet loss threshold. The packet loss threshold is a constant value determined apriori or is provided by the user. In another embodiment, the packet loss threshold is determined based on a quality criteria imposed by a WBAN system user such as a hospital. In one example, the quality criteria may specify number of packets that can be lost in twenty four hours of time. An average value of packet loss may be determined as the packet loss threshold based on such a quality criteria. Alternatively, a time varying packet loss threshold may be determined based on the actual number of packets lost at a particular time instant. In one embodiment, the gateway 118 is configured to consider other criteria such as, but not limited to, received signal strength (RSSI), and carrier to interference ratio (C/I) of the WBAN 124 to modify the channel packet loss information.

The gateway 118 is further configured to switch flow of the sensor data 130 and the beacon data 142 from a channel among the first set of transmission channels 132 to a channel among a second set of transmission channels 136 based on outcome of the comparison. The second set of transmission channels 136 is different from the first set of transmission channels 132 and is representative of collision free transmission channels. The plurality of transmission channels of the second set of transmission channels 136 may also be referred to as 'replacement channels' herein. In one embodiment, the first set of transmission channels 132 and the second set of transmission channels 136 are selected from a plurality of sets of channels. For example, if the group may have sixteen sets of channels, the gateway 118 and the plurality sensor nodes 108, 110, 112, 114, 116 are configured to select one set of channels as the first set of transmission channels 132 and another set of channels as the second set of transmission channels 136 from the group during the pairing process.

In one embodiment, the gateway 118 is further configured to categorize a particular transmission channel which has a data loss value less than a predetermined data loss threshold, as part of the second set of transmission channels 136. Further, in one embodiment, the second set of transmission channels 136 are ranked based on a plurality of data loss values corresponding to the second set of transmission channels 136. In such an embodiment, the transmission channel having least data loss value is selected as a replacement channel.

In an alternative embodiment, each of the plurality of sensor nodes 108, 110, 112, 114, 116 may determine sensor packet loss information, beacon packet loss information, and the channel packet loss information independently. In such an embodiment, each of the plurality of sensor nodes 108, 110, 112, 114, 116 is configured to determine a decision to switch the flow of the sensor data 130 and the beacon data 142. As a result, a plurality of switching decisions is generated. Further, the plurality of switching decisions is collated by the gateway 118 and switching of the flow of the sensor data 130 and the beacon data 142 is affected based on the collated decision. In another embodiment, the sensor packet loss information, the beacon packet loss information, and the channel packet loss information are determined by the gateway 118. In such an embodiment, a decision to switch the flow of the sensor data 130 and the beacon data 142 is determined based on the channel packet loss information.

In one embodiment, the packet loss threshold is a predefined numerical value and may be provided by the user. In another embodiment, the packet loss threshold may be predetermined based on analytical techniques or using Monte Carlo simulations. In one embodiment, the gateway 118 is configured to switch flow of the sensor data 130 and the beacon data 142 from the first transmission channel 134 to a second transmission channel 138 from second set of transmission channels 136. In such an embodiment, the first transmission channel 134 is excluded or is not considered as part of the first set of transmission channels 132. In the same embodiment, the second transmission channel 138 is, excluded from the second set of transmission channels 136 and included as part of the first set of transmission channels 132.

In one embodiment, the first set of transmission channels 132 has a first set of transmission frequencies. Channel packet loss information is determined corresponding to each transmission frequency among the first set of frequencies. In one embodiment, the channel packet loss information is determined at the gateway 118. In another embodiment, the channel packet loss information is determined at the plurality of sensor nodes 108, 110, 112, 114, 116. In further aspects of the disclosed embodiments, the channel packet loss information may be determined based on importance of a particular sensor node within the WBAN 124. In one embodiment, the importance of a particular sensor node is represented by a numerical value used as a weightage for corresponding channel packet loss information. For example, a particular sensor node contributing to relatively higher data traffic may have a higher weightage associated with the node. In another example, the numerical value may be based on a type of sensor used. In another embodiment, the channel packet loss information is determined based on the amount of data transmitted by a sensor node among the plurality of sensor nodes 108, 110, 112, 114, 116 of the WBAN 124. In another embodiment, the channel packet loss information is determined based on a latency requirement of a sensor node among the plurality of sensor nodes 108, 110, 112, 114, 116 of the WBAN 124. In general, determining the channel packet loss information involves determining a weighted average of the plurality of sensor packet loss values corresponding to the plurality of sensor nodes.

The second set of transmission channels 136 has a second set of transmission frequencies. The first set of transmission frequencies is distinct from the second set of frequencies. The sensor data flow and the beacon data flow are switched adaptively from one of the first set of transmission frequencies to one of the second set of transmission frequencies based on the channel packet loss information. The communication protocol disclosed herein may be referred herein as an adaptive multi-frequency wireless communication protocol.

In one embodiment, the gateway 118 and the plurality of sensor nodes 108, 110, 112, 114, 116 include a processor unit and a memory unit. The processor unit may include at least one of an arithmetic logic unit, a microprocessor, a general purpose controller, and a processor array to perform the desired computations or run the computer programs. The memory unit is communicatively coupled to the processor unit. In an exemplary embodiment, the memory unit may include one or more memory modules. The memory unit may be a non-transitory storage medium. For example, the memory may be a dynamic random access memory (DRAM) device, a static random access memory (SRAM) device, flash memory or other memory devices. In one embodiment, the memory unit may include a non-volatile memory or similar permanent storage device, media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. In one embodiment, the processor unit may include more than one processor. In another embodiment, a non-transitory computer readable medium having instructions may be used to enable at least one processor to control data flow in the wireless body area network 124.

It should be noted herein that the exemplary technique is not limited to the first transmission channel 134 or to the first WBAN 124 of FIG. 1 and is applicable to other transmission channels and other WBANs 126, 128.

Figure 2:
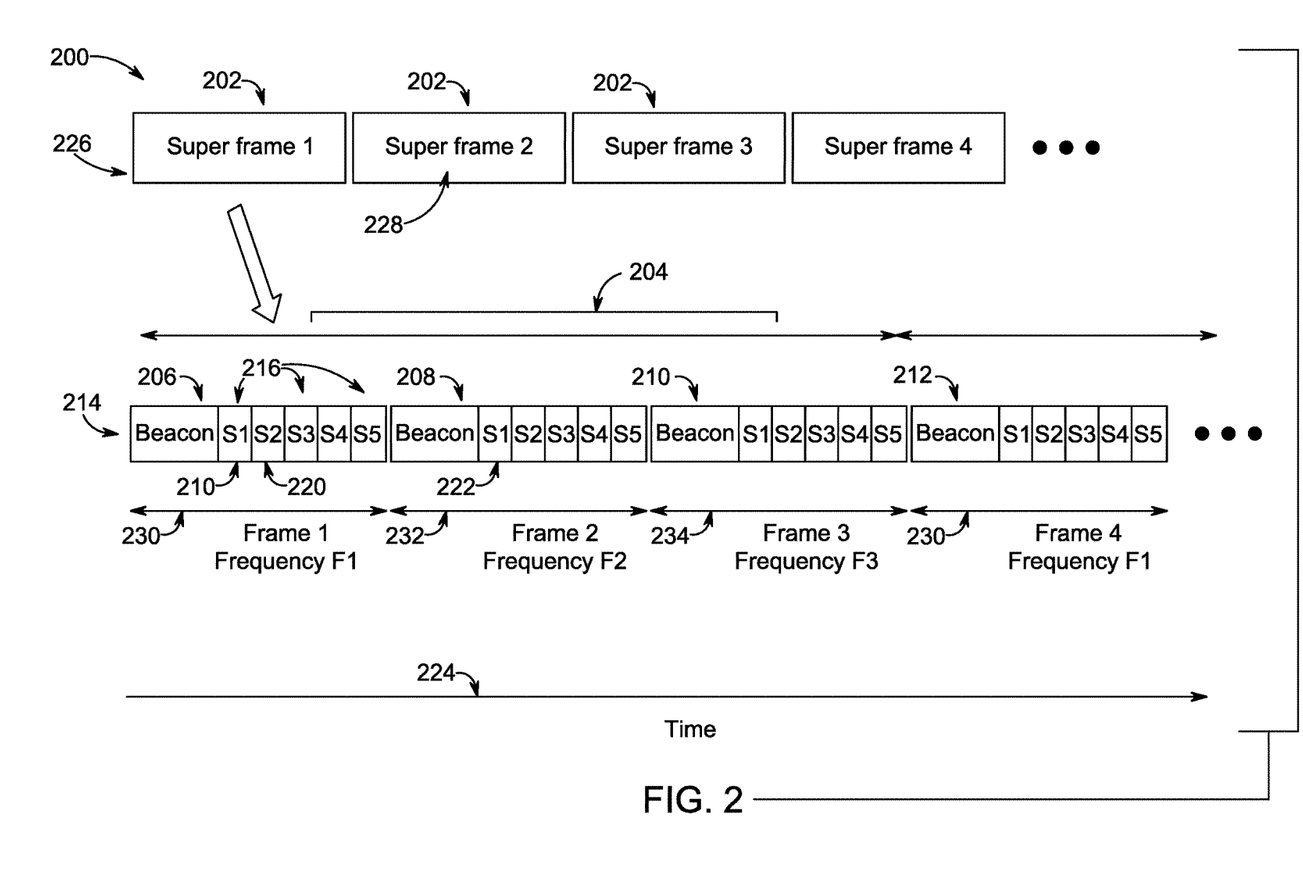
FIG. 2 is an illustration of a packet structure in a superframe of a body area network in accordance with an exemplary embodiment.

FIG. 2 is an illustration of a frame structure 200 of the adaptive multi-frequency communication protocol employed in the body area network 124 in accordance with an exemplary embodiment of FIG. 1. The sensor data 130 is organized in a set of super frames 202 transmitted sequentially in time represented by a time axis 224. Each frame of the set of super frames 202, includes a plurality of frames 204 arranged and transmitted sequentially in time. In the illustrated embodiment, a first super frame 226 and a second super frame 228 from the set of super frames 202 are illustrated in greater detail. In the illustrated embodiment, the first super frame 226 includes three frames 206, 208, 210 and the second super frame 228 includes one frame 212 (other frames of the second super frame 228 are not shown).

Each of the plurality of frames of a particular super frame includes a beacon packet followed by a plurality of data packets corresponding to the plurality of the sensor nodes of the WBAN. The beacon packet includes beacon data transmitted from the gateway to the plurality of sensor nodes. The data packets include sensor data transmitted from the plurality of sensor nodes to the gateway. As illustrated, the first frame 206 of the first super frame 226 includes a beacon packet 214 and a plurality of data packets 216. In the illustrated embodiment, the beacon packet 214 is positioned at the beginning of the first frame 206. The plurality of data packets 216 includes a first data packet 218 having sensor data gathered by the sensor node 108 and a second data packet 220 that includes sensor data gathered by the sensor node 110 of the WBAN 124. Similarly, the second frame 208 of the first super frame 226 includes a first data packet having sensor data from the sensor node 108.

Further, according to one aspect of the adaptive multi-frequency communication protocol, each of the plurality of frames of a particular super frame has a predefined transmission frequency among a plurality of transmission frequencies corresponding to the first set of transmission channels 132. For example, the plurality of frames 204 is transmitted at a plurality of transmission frequencies 230, 232, 234. Specifically, the first frame 206 of the first super frame 226 is transmitted at the first transmission frequency 230, the second frame 208 is transmitted at the second transmission frequency 232, and the third frame 210 is transmitted at the third transmission frequency 234. Similarly, the first frame 212 of the second super frame 228 is transmitted at the first transmission frequency 230.

In one embodiment, if the sensor node 108, for example, does not receive an acknowledgement of the reception of first data packet 218 by the gateway 118, the sensor node 108 transmits the sensor data of the first data packet 218 again in a packet 222. Re-transmission of packets is continued till the reception of the acknowledgement or till a maximum number of re-transmission is performed. In another embodiment, when the packet loss information corresponding to a first frame of successive super frames exceeds the packet loss threshold, the data flow is switched from the first transmission frequency 230. Similarly, when the packet loss information corresponding to a second frame of successive super frames exceeds the packet loss threshold, the data flow is switched from the second transmission frequency 232. When the packet loss information corresponding to a third frame of successive super frame exceeds the packet loss threshold, the data flow is switched from the third transmission frequency 234.

In some embodiments, one transmission channel among the first set of transmission channels may be identified for periodical switching of data. For example, the third transmission frequency 232 used for transmitting the third frame 210 may be changed in a periodical manner. The plurality of sensors and the gateway may communicate the first transmission frequency 230, the second transmission frequency 232, and the time instant of switching the third transmission frequency 232. It should be noted herein that the periodical switching of the third transmission frequency 232 is communicated to all the sensors and the gateway to ensure synchronization at all instants of time.

Figure 3:
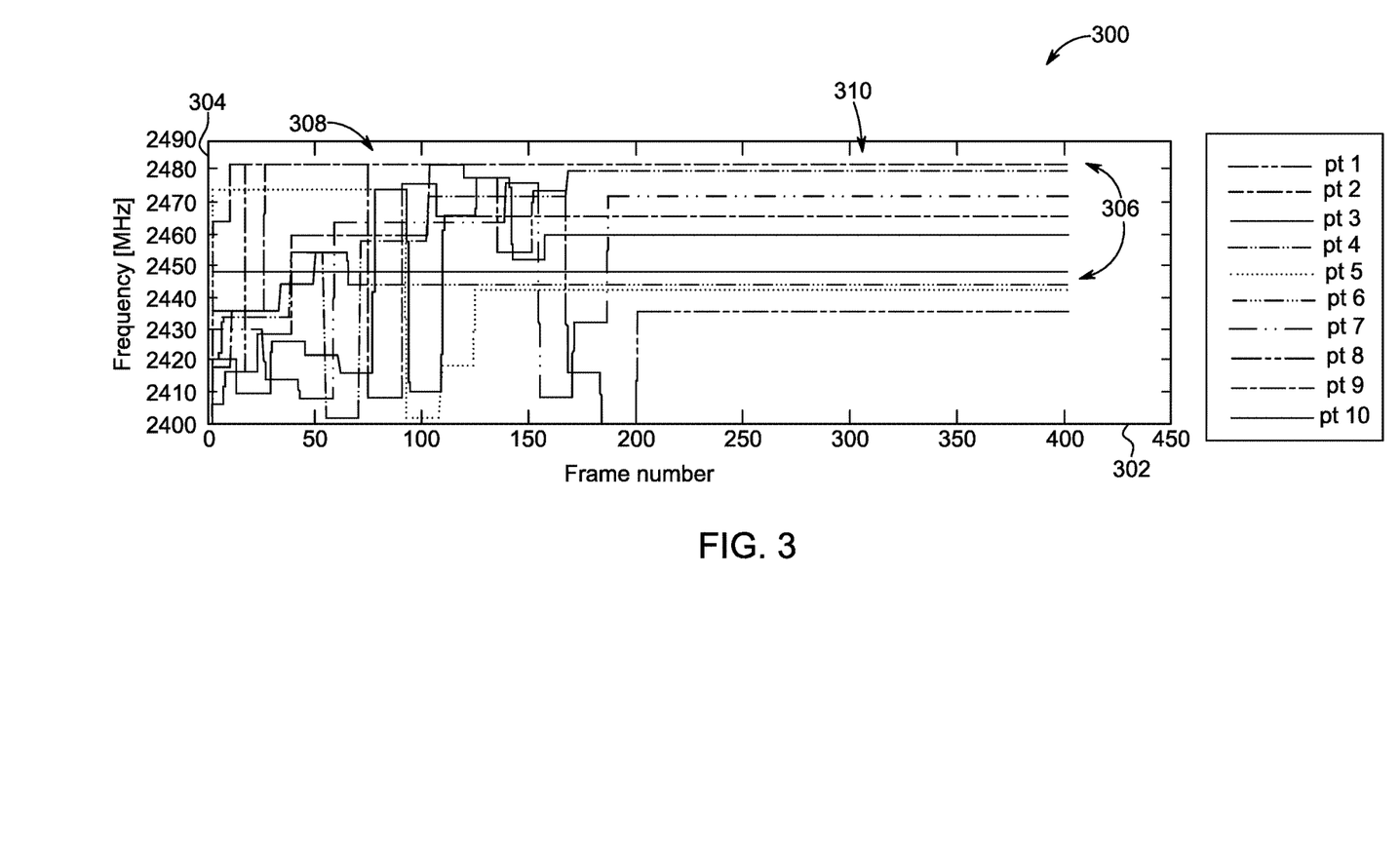
FIG. 3 is graph illustrating frequency hopping of a plurality of channels from a plurality of body area networks using an adaptive multi-frequency hopping protocol in accordance with an exemplary embodiment.

FIG. 3 is graph 300 illustrating frequency hopping over a plurality of channels of a plurality of body area network using an adaptive multi-frequency communication protocol in accordance with an exemplary embodiment. The graph 300 includes an x-axis 302 representative of time and a y-axis 304 representative of frequency of transmission of data. The graph 300 includes a set of curves 306 representative of transmission frequencies of a first frame of data transmitted through ten WBANs co-located in the same wireless body area network system. Each curve among the set of curves 306 is representative of transmission frequency of the first frame of a super frame corresponding to each of the ten co-located WBANs. An initial portion 308 of the set of curves 306 is representative of transmission frequency hopping. The operating frequencies of the WBANs interfere with each other and hence the adaptive multi-frequency communication protocol changes the operating frequencies frequently. With reference to a latter portion of a curve 310 of the set of curves 306, the operating frequencies are not changed because interferences from other WBANs are within the tolerable limits.

Figure 4:
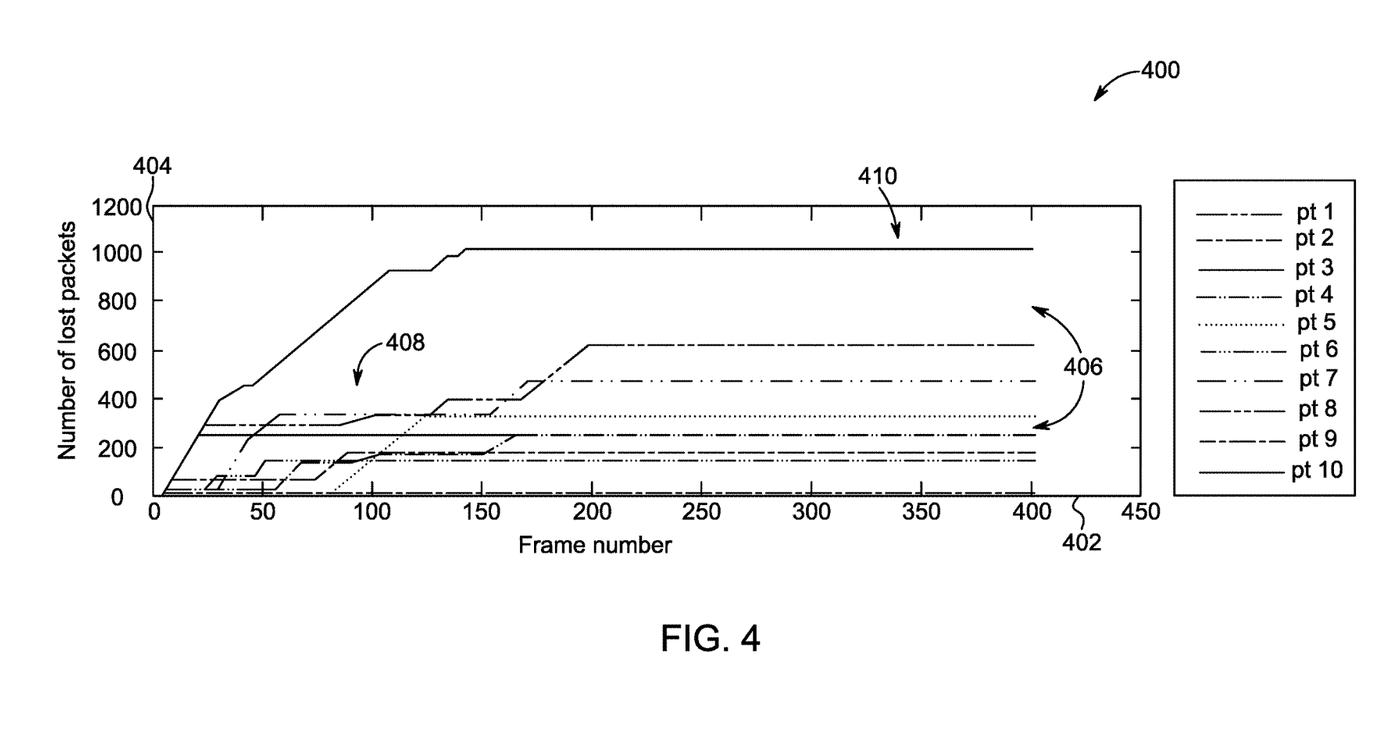
FIG. 4 is a graph illustrating packet loss in a plurality of channels of a plurality of body area networks using an adaptive multi-frequency hopping protocol in accordance with an exemplary embodiment.

FIG. 4 is a graph 400 illustrating packet loss in a plurality of channels of a plurality of body area networks, using an adaptive multi-frequency hopping protocol in accordance with an exemplary embodiment. The graph 400 includes an x-axis 402 representative of time and a y-axis 404 representative of lost packets during data communication. A plurality of curves 406 is representative of a cumulative number of lost data packets during data communication with reference to time. An initial portion 408 of the curves 406 is representative of an increasing trend because a plurality of operating transmission frequencies interferes with each other. Hence, the adaptive multi-frequency communication protocol changes the operating transmission frequencies to reduce inter channel interference. A latter portion 410 of the curves 406 is representative of a constant trend because the data packet loss is reduced to zero and hence the cumulative data packets loss is constant.

Figure 5:
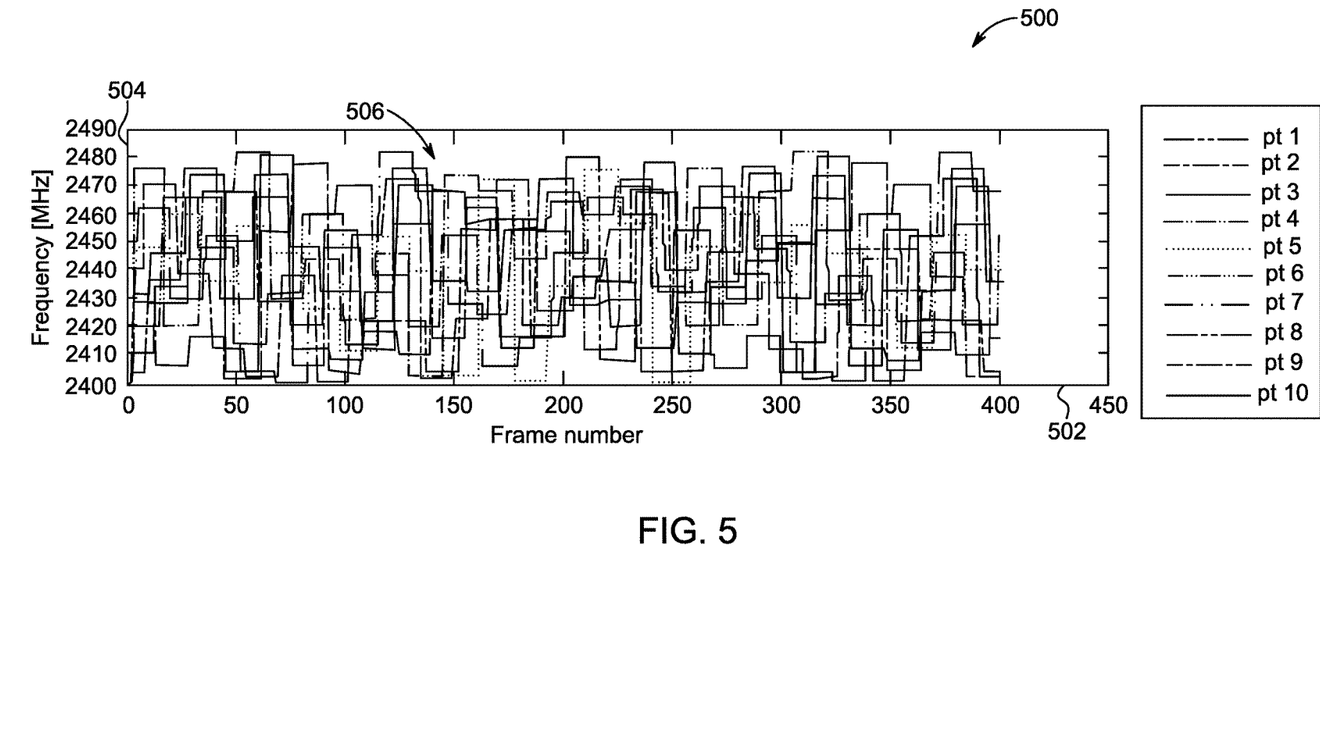
FIG. 5 is a graph illustrating frequency hopping of a plurality of channels of a plurality of body area networks using a frequency hopping protocol in accordance with an exemplary embodiment.

FIG. 5 is a graph 500 illustrating frequency hopping of a plurality of channels of a plurality of body area networks, using a frequency hopping protocol in accordance with an exemplary embodiment. The graph 500 includes an x-axis 502 representative of time and a y-axis 504 representative of frequency of data transmission. The graph 500 includes a plurality of curves 506 representative of transmission frequencies of a first frame through ten WBANs co-located in the same wireless body area network system. Each curve among the plurality of curves is representative of transmission frequency of the first frame of a super frame transmitted through each of the ten co-located WBANs. The operating transmission frequencies corresponding to each of the plurality of WBANs, are changed either at regular intervals or based on a performance related criterion. The new transmission frequencies may also experience interference from other channels. Hence, continued frequency hopping is performed.

Figure 6:
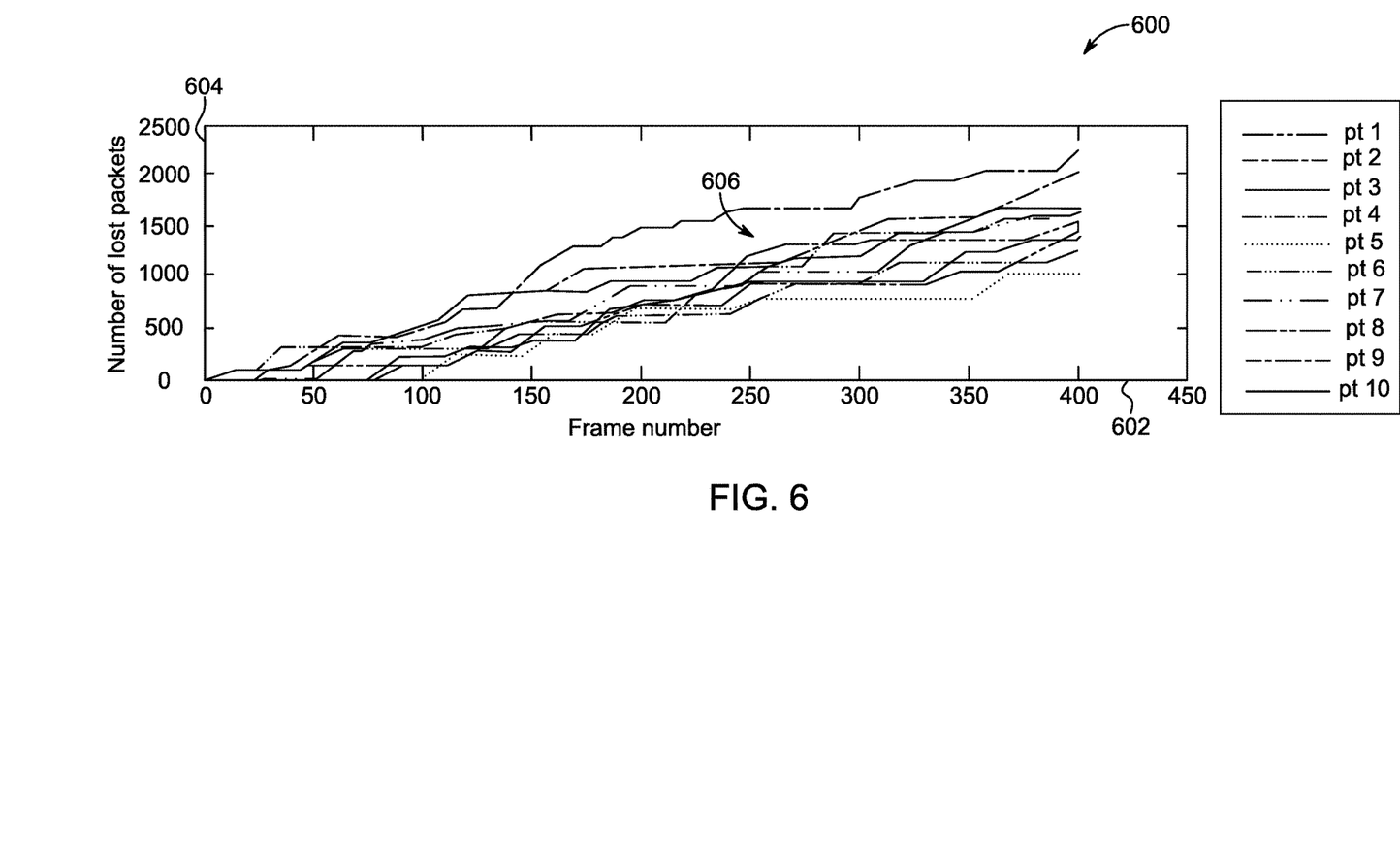
FIG. 6 is a graph illustrating packet loss in a plurality of channels of a plurality of body area networks, using a frequency hopping protocol in accordance with an exemplary embodiment.

FIG. 6 is a graph 600 illustrating packet loss in a plurality of channels of a plurality of body area networks, using a frequency hopping protocol in accordance with an exemplary embodiment. The graph 300 includes an x-axis 602 representative of time and a y-axis 604 representative of frequency of data transmission. A plurality of curves 606 is representative of a cumulative number of data packets losses during data communication with reference to time. The plurality of curves 606 is representative of an increasing trend due to the frequency hopping. The plurality of operating transmission frequencies interferes with each other and hence the number of data packets loss as a function of frame number is increased.

Figure 7:
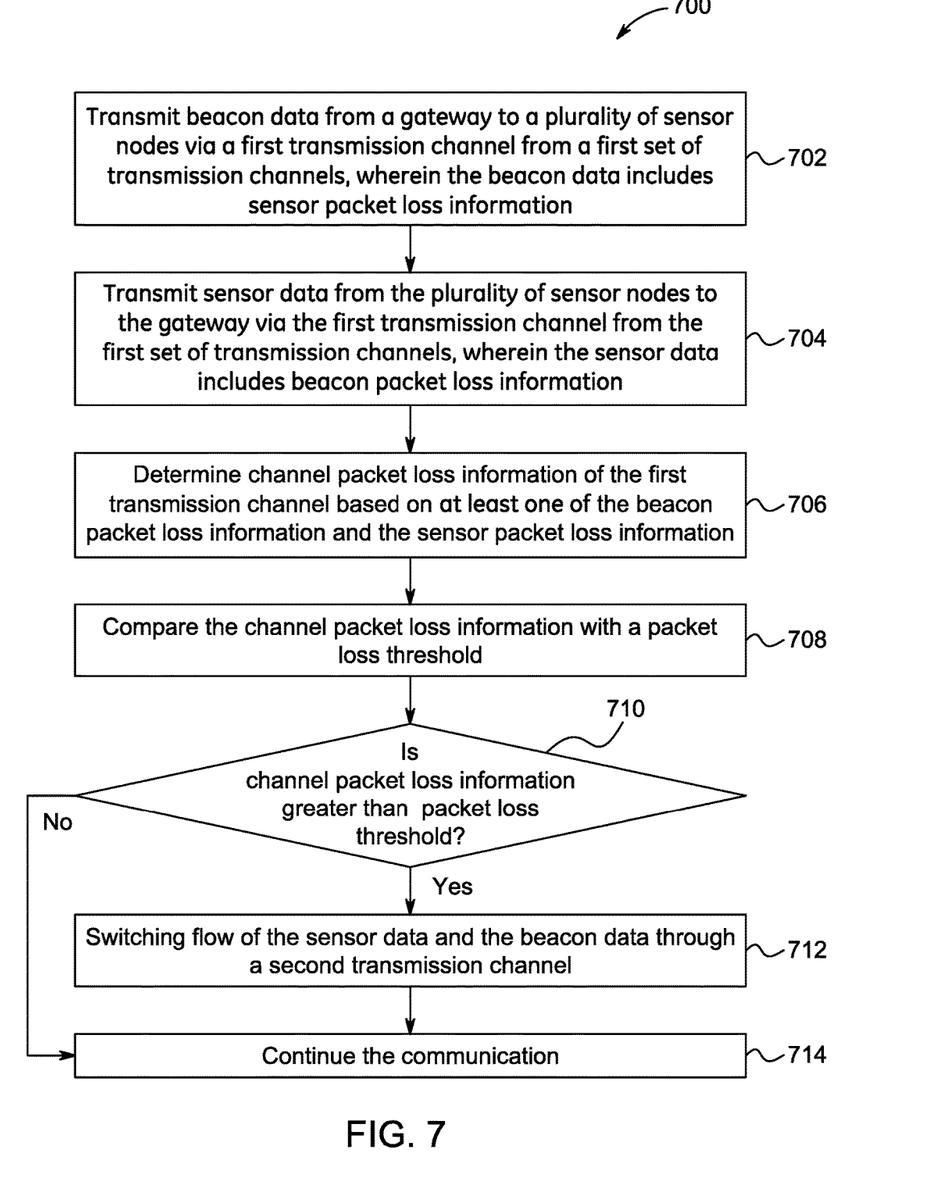
FIG. 7 is a flow chart of a method of communication for a body area network in accordance with an exemplary embodiment.

FIG. 7 is a flow chart 700 of a method for communication in a body area network in accordance with an exemplary embodiment. The method includes transmitting beacon data from a gateway to a plurality of sensor nodes via a first transmission channel from a first set of transmission channels in step 702. The first transmission channel is selected from the first set of transmission channels. The beacon data includes sensor packet loss information of the first transmission channel. The method further includes transmitting sensor data from a plurality of sensor nodes to the gateway via the first transmission channel in step 704. The sensor data is transmitted using a multiplexing technique. The sensor data includes beacon packet loss information of the first transmission channel.

The method further includes determining channel packet loss information of the first transmission channel based on at least one of the sensor packet loss information and the beacon packet loss information in step 706. In one embodiment, other criteria such as, but not limited to, received signal strength (RSSI), and carrier to interference ratio (C/I) of the body area network may be used to modify the channel packet loss information. The channel packet loss information is compared with a packet loss threshold in step 708. In step 710, the method includes checking if the channel packet loss is greater than the packet loss threshold. In one embodiment, each of the transmission channels may have a different packet loss threshold. The outcome of the comparison in step 710 is communicated to all the sensor nodes and the gateway. If the channel packet loss is greater than the packet loss threshold, flow of the data is switched in step 712. The flow of the sensor data and the beacon data is switched to a second transmission channel instead of the first transmission channel. The second transmission channel is selected from a second set of transmission channels different from the first set of transmission channels.

The plurality of sensors and the gateway synchronize the switching of the data at a particular transmission frequency at a same time instant. In one example, synchronization of switching of the data at a transmission frequency may be effected after transmission of a pre-determined number of super frames. The pre-determined number of super frames may be specified during the pairing process. In another embodiment, the gateway may be configured to switch the data at a new transmission frequency based on the channel packet loss information. In such an embodiment, the gateway communicates the decision to the plurality of sensor nodes via the beacon data specifying the time instant and the new transmission frequency. If the channel packet loss is less than or equal to the packet loss threshold, the data communication is continued through the first transmission channel in step 714.

In one embodiment, the switching of flow of the sensor data and the beacon data includes determining a plurality of packet loss values representative of packet loss information corresponding to a plurality of channels among the second set of transmission channels. The switching of flow of the sensor data and the beacon data further includes ranking the plurality of the channels among the second set of transmission channels based on the plurality of packet loss values. Further, the switching of flow of the sensor data and the beacon data includes selecting a channel among the plurality of channels having a least packet loss value from the plurality of packet loss values.

Embodiments of the adaptive multi-frequency communication protocol disclosed herein reduce data loss in the WBANs by reducing the frequency of switching of data flow between transmission channels based on a reliable quality indicator such as number of data packets lost during transmission. Further, only one of the plurality of operating transmission channels used by the WBANs is changed, thereby reducing the time for resynchronization. The reliability of data communication in a wireless body area network system is enhanced.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

The invention claimed is:

1. A method for controlling data flow in a wireless body area network, the method comprising:
   transmitting sensor data from a plurality of sensor nodes to a gateway via a first transmission channel from a first set of transmission channels, using a multiplexing technique, wherein the sensor data comprises beacon packet loss information corresponding to the first transmission channel;
   transmitting beacon data from the gateway to the plurality of sensor nodes via the first transmission channel from the first set of transmission channels, wherein the beacon data comprises sensor packet loss information corresponding to the first transmission channel;
   determining channel packet loss information of the first transmission channel based on the beacon packet loss information and the sensor packet loss information;
   comparing the channel packet loss information with a packet loss threshold;
   generating a decision to switch flow of the sensor data and the beacon data through a second transmission channel from a second set of transmission channels different from the first set of transmission channels, instead of the first transmission channel, if the channel packet loss information is greater than the packet loss threshold;
   communicating the decision to switch the flow of the sensor data and the beacon data to the plurality of sensor nodes via the beacon data, wherein the beacon data comprises a time instant for switching and a transmission frequency corresponding to the second transmission channel; and
   switching the flow of the sensor data and the beacon data through the second transmission channel to ensure continued synchronization between the plurality of sensor nodes and the gateway.

2. The method of claim 1, wherein the multiplexing technique comprises a time division multiplexing of the sensor data transmitted from the plurality of sensor nodes.

3. The method of claim 1, wherein the sensor data comprises at least one of electrocardiogram (ECG) data, electroencephalogram (EEG) data, Saturation of Peripheral Oxygen (SpO2) data, and temperature data obtained from the plurality of sensor nodes disposed on a patient.

4. The method of claim 1, further comprising transmitting a plurality of frames of a super frame, sequentially in time, wherein each frame among the plurality of frames comprises the beacon data and the sensor data positioned sequentially.

5. The method of claim 4, wherein each of the plurality of frames has a predefined transmission frequency among a plurality of transmission frequencies corresponding to a plurality of channels among the first set of transmission channels.

6. The method of claim 1, wherein determining the channel packet loss information comprises determining a weighted average of a plurality of sensor packet loss values corresponding to the plurality of sensor nodes.

7. The method of claim 1, wherein the packet loss threshold is a predefined numerical value.

8. The method of claim 1, wherein the second transmission channel is representative of a collision free transmission channel.

9. The method of claim 1, wherein switching the flow of the sensor data and the beacon data comprises replacing the first transmission channel in the first set of transmission channels by the second transmission channel.

10. The method of claim 1, wherein switching the flow of the sensor data and the beacon data comprises:
determining a plurality of packet loss values representative of packet loss information corresponding to a plurality of channels among the second set of transmission channels;
ranking the plurality of channels among the second set of transmission channels based on the plurality of packet loss values; and
selecting a channel among the plurality of channels having a least packet loss value from the plurality of packet loss values.

11. A wireless body area network system comprising:
a plurality of sensor nodes configured to transmit sensor data via a first transmission channel from a first set of transmission channels, using a multiplexing technique, wherein the sensor data comprises beacon packet loss information corresponding to the first transmission channel;
a gateway communicatively coupled to the plurality of sensor nodes and configured to:
transmit beacon data to the plurality of sensor nodes via the first transmission channel from the first set of transmission channels, wherein the beacon data comprises sensor packet loss information corresponding to the first transmission channel;
determine channel packet loss information of the first transmission channel based on the beacon packet loss information and the sensor packet loss information;
compare the channel packet loss information with a packet loss threshold;
generate a decision to switch flow of the sensor data and the beacon data through a second transmission channel from a second set of transmission channels different from the first set of transmission channels, instead of the first transmission channel, if the channel packet loss information is greater than the packet loss threshold;
communicate the decision to switch the flow of the sensor data and the beacon data to the plurality of sensor nodes via the beacon data, wherein the beacon data comprises a time instant for switching and a transmission frequency corresponding to the second transmission channel; and
switch the flow of the sensor data and the beacon data through the second transmission channel to ensure continued synchronization between the plurality of sensor nodes and the gateway.

12. The system of claim 11, wherein the multiplexing technique comprises a time division multiplexing of the sensor data transmitted from the plurality of sensor nodes.

13. The system of claim 11, wherein the sensor data comprises at least one of electrocardiogram (ECG) data, electroencephalogram (EEG) data, Saturation of Peripheral Oxygen (SpO2), and temperature data obtained from the plurality of sensor nodes disposed on a patient.

14. The system of claim 11, wherein the sensor data and the beacon data are transmitted in a plurality of frames of a super frame, sequentially in time.

15. The system of claim 14, wherein each of the plurality of frames has a predefined transmission frequency among a plurality of transmission frequencies corresponding to a plurality of channels among the first set of transmission channels.

16. The system of claim 11, wherein the gateway is further configured to determine a weighted average of a plurality of sensor packet loss values corresponding to the plurality of sensor nodes.

17. The system of claim 11, wherein the packet loss threshold is a predefined numerical value.

18. The system of claim 11, wherein the second transmission channel is representative of a collision free transmission channel.

19. The system of claim 11, wherein gateway is further configured to replace the first transmission channel in the first set of transmission channels by the second transmission channel.

20. The system of claim 11, wherein the gateway is configured to switch the flow of the sensor data and the beacon data by:
determining a plurality of packet loss values representative of packet loss information corresponding to a plurality of channels among the second set of transmission channels;
ranking the plurality of channels among the second set of transmission channels, based on the plurality of packet loss values; and
selecting a channel among the plurality of channels having a least packet loss value from the plurality of packet loss values.

21. A non-transitory computer readable medium having instructions to enable at least one processor to control data flow in a wireless body area network by:
transmitting sensor data from a plurality of sensor nodes to a gateway via a first transmission channel from a first set of transmission channels, using a multiplexing technique, wherein the sensor data comprises beacon packet loss information corresponding to the first transmission channel;
transmitting beacon data from the gateway to the plurality of sensor nodes via the first transmission channel from the first set of transmission channels, wherein the beacon data comprises sensor packet loss information corresponding to the first transmission channel;
determining channel packet loss information of the first transmission channel based on the beacon packet loss information and the sensor packet loss information;
comparing the channel packet loss information with a packet loss threshold;
generating a decision to switch flow of the sensor data and the beacon data through a second transmission channel from a second set of transmission channels different from the first set of transmission channels, instead of the first transmission channel, if the channel packet loss information is greater than the packet loss threshold;

communicating the decision to switch the flow of the sensor data and the beacon data to the plurality of sensor nodes via the beacon data, wherein the beacon data comprises a time instant for switching and a transmission frequency corresponding to the second transmission channel; and switching the flow of the sensor data and the beacon data through the second transmission channel to ensure continued synchronization between the plurality of sensor nodes and the gateway.

* * * * *